United States Patent [19]

Fisher et al.

[11] Patent Number: 5,572,685

[45] Date of Patent: Nov. 5, 1996

[54] COMPUTER SYSTEM

[75] Inventors: John G. Fisher, Congleton; Stephen Gold, Camberley; Philip Worsdale, Stoke-On-Trent, all of Great Britain

[73] Assignee: International Computers Limited, London, England

[21] Appl. No.: 398,577

[22] Filed: Mar. 3, 1995

[30] Foreign Application Priority Data

Mar. 23, 1994 [GB] United Kingdom ............ 9405855

[51] Int. Cl.$^6$ .................................................. G06F 13/36
[52] U.S. Cl. .................... 395/287; 395/311; 395/283
[58] Field of Search ................................ 395/287, 750, 395/293, 290, 856, 858, 311

[56] References Cited

U.S. PATENT DOCUMENTS

| | | | |
|---|---|---|---|
| 4,015,246 | 3/1972 | Hopkins, Jr. et al. | 340/172.5 |
| 4,148,011 | 4/1979 | McLugan et al. | 395/288 |
| 4,809,163 | 2/1989 | Hirosawa et al. | 395/750 |
| 5,036,493 | 7/1991 | Nielsen | 365/230.03 |
| 5,083,266 | 1/1992 | Watanabe | 395/750 |
| 5,088,023 | 2/1992 | Nakamura et al. | 395/425 |
| 5,118,970 | 6/1992 | Olson | 307/443 |
| 5,182,808 | 1/1993 | Bagnoli et al. | 395/299 |
| 5,191,656 | 3/1993 | Forde, III et al. | 395/325 |
| 5,276,839 | 1/1994 | Robb et al. | 395/425 |
| 5,345,564 | 9/1994 | Jensen et al. | 395/275 |
| 5,408,668 | 4/1995 | Tornai | 395/750 |
| 5,418,911 | 5/1995 | Zilka et al. | 395/325 |
| 5,418,969 | 5/1995 | Mutsuzaki et al. | 395/750 |
| 5,434,983 | 6/1995 | Yaso et al. | 395/290 |
| 5,452,401 | 9/1995 | Lin | 395/750 |
| 5,454,111 | 9/1995 | Frame et al. | 395/288 |
| 5,483,656 | 1/1996 | Oprescu et al. | 395/750 |

FOREIGN PATENT DOCUMENTS 2671887   7/1992   France .

OTHER PUBLICATIONS

IBM Technical Disclosure Bulletin, vol. 33, No. 11, Apr. 1991, pp. 331–335, "Differential–Single–Ended SCSI Interface Description".

Primary Examiner—Jack B. Harvey
Assistant Examiner—Ayaz R. Sheikh
Attorney, Agent, or Firm—Lee, Mann, Smith, McWilliams, Sweeney & Ohlson

[57] ABSTRACT

A computer system has a backplane including a SCSI (small computer system interface) bus for connecting a host processor to a number of disk drive units. The bus operates in a conventional manner to set up a connection, until the stage where the initiator selects a target. Then backplane control logic intervenes, and isolates all units on the bus other than the initiator and the target. Isolation is achieved by means of a set of bus switches on the backplane, controlled by the backplane control logic. This ensures that data transfer takes place over a simple one-to-one connection, reducing bus capacitance and reflections. The backplane also includes power switches that can be operated to power down any disk unit while it is being hot-swapped, and LEDs to indicate when it is safe to hot-swap a disk unit.

5 Claims, 2 Drawing Sheets

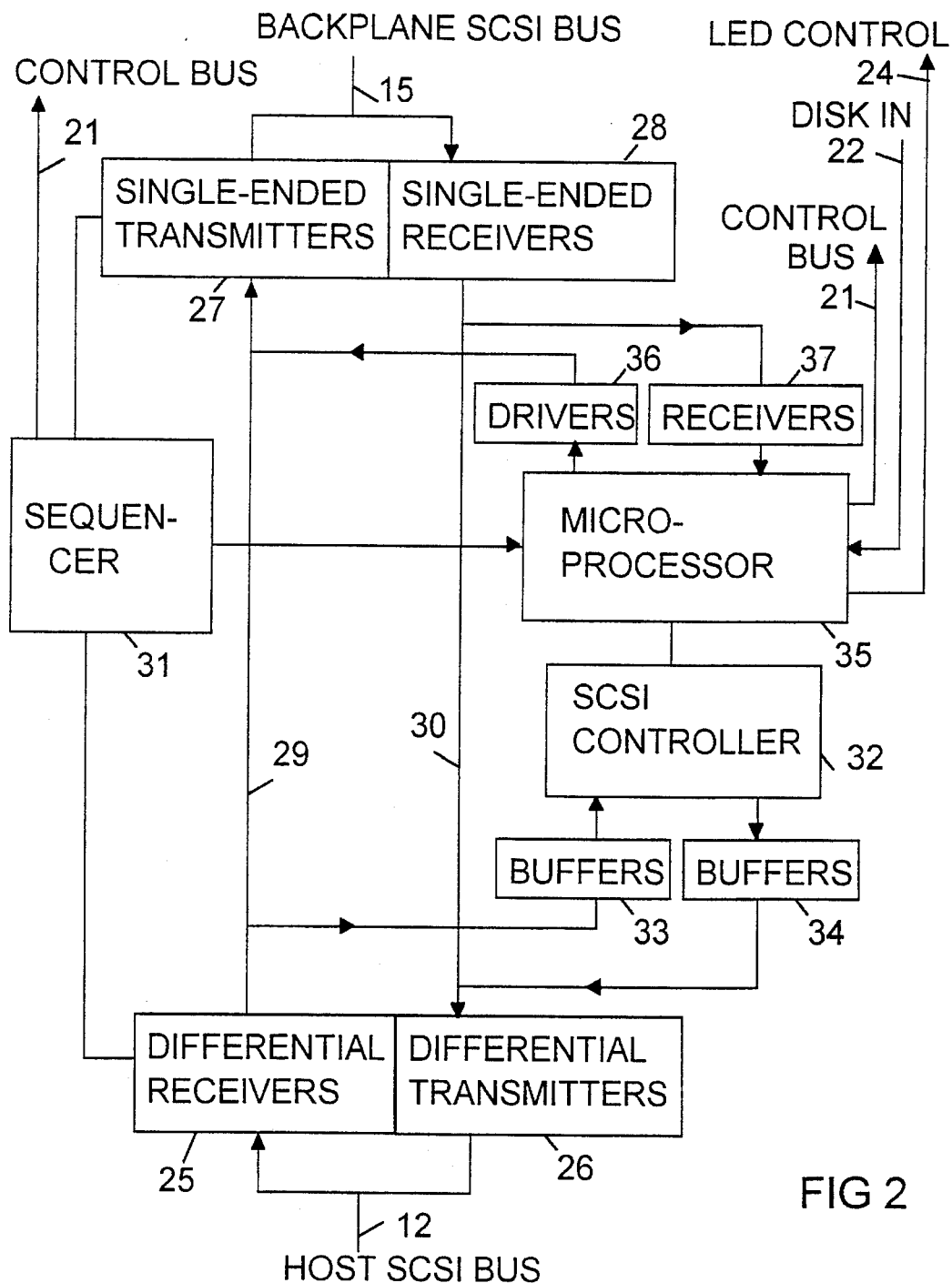

COMPUTER SYSTEM

BACKGROUND TO THE INVENTION

This invention relates to computer systems.

It is well known to interconnect units in a computer system by means of a bus. For example, a host processor may be connected to a number of disk drive units by a bus, such as for example a standard SCSI (small computer system interface) bus. An advantage of using a SCSI bus is that there are many standard, commercially available units, such as SCSI disk drive units, which can be connected to the bus.

A problem with some known busses, such as single-ended SCSI busses, is that they may suffer from high bus capacitance and reflections, due to the small physical separation between the devices, which significantly reduces the rate of data transfer over the bus and/or limits the number of units that can be connected to the bus. These problems can be avoided to some extent by using more complex forms of bus, such as the differential SCSI bus, but such busses tend to be significantly more expensive.

The object of the present invention is to overcome these problems in a novel manner.

SUMMARY OF THE INVENTION

According to the invention there is provided a computer system comprising:

(a) a plurality of units;

(b) a bus, interconnecting said units;

(c) bus arbitration means connected to said bus for setting up a bus transfer between two of said units, and for then producing a busy signal on said bus indicating that said bus is busy;

(d) isolation means, connected between said units and said bus, for selectively isolating said units from said bus;

(e) control means connected to said bus and to said isolation means, for capturing identifiers from said bus identifying the two of said units that are participating in said bus transfer and for then instructing said isolation means to isolate from the bus all of said units other than the two of said units that are participating in said bus transfer, while said bus is busy.

It can be seen that the bus operates as a conventional bus, until the initiator selects the target. Then the control logic intervenes, and isolates all the units on the bus except the initiator and target. Thus, as far as the individual units are concerned, the bus is entirely standard, and so standard units can be connected to the bus without modification. However, isolation of the non-participating units after the selection phase ensures that data transfer takes place over a simple one-to-one connection, and so is very "clean" in terms of reduced capacitance and reflections.

It is desirable to allow "hot-swapping" of units on the bus; i.e. removal and replacement of units from the bus while the system is running and data is passing along the bus. A problem with hot-swapping is that it can cause electrical disturbances on the bus when the units are removed or replaced. In a preferred form of the invention, the control logic is arranged to facilitate hot-swapping, by isolating a selected unit from the bus, powering that unit down, and then producing an indication that the selected unit is ready for hot-swapping. Preferably also, the control logic includes means for powering up a selected unit on the bus and then waiting until the bus is free before connecting the unit to the bus.

According to another preferred feature of the invention, when a unit is isolated from the bus, it is held in a busy state, to prevent it from attempting to arbitrate for access to the bus. As will be shown, this ensures that all the units are kept in step when they are reconnected to the bus.

BRIEF DESCRIPTION OF THE DRAWINGS

FIG. 2 is a block diagram showing a backplane controller.

DESCRIPTION OF AN EMBODIMENT OF THE INVENTION

Figure 1:
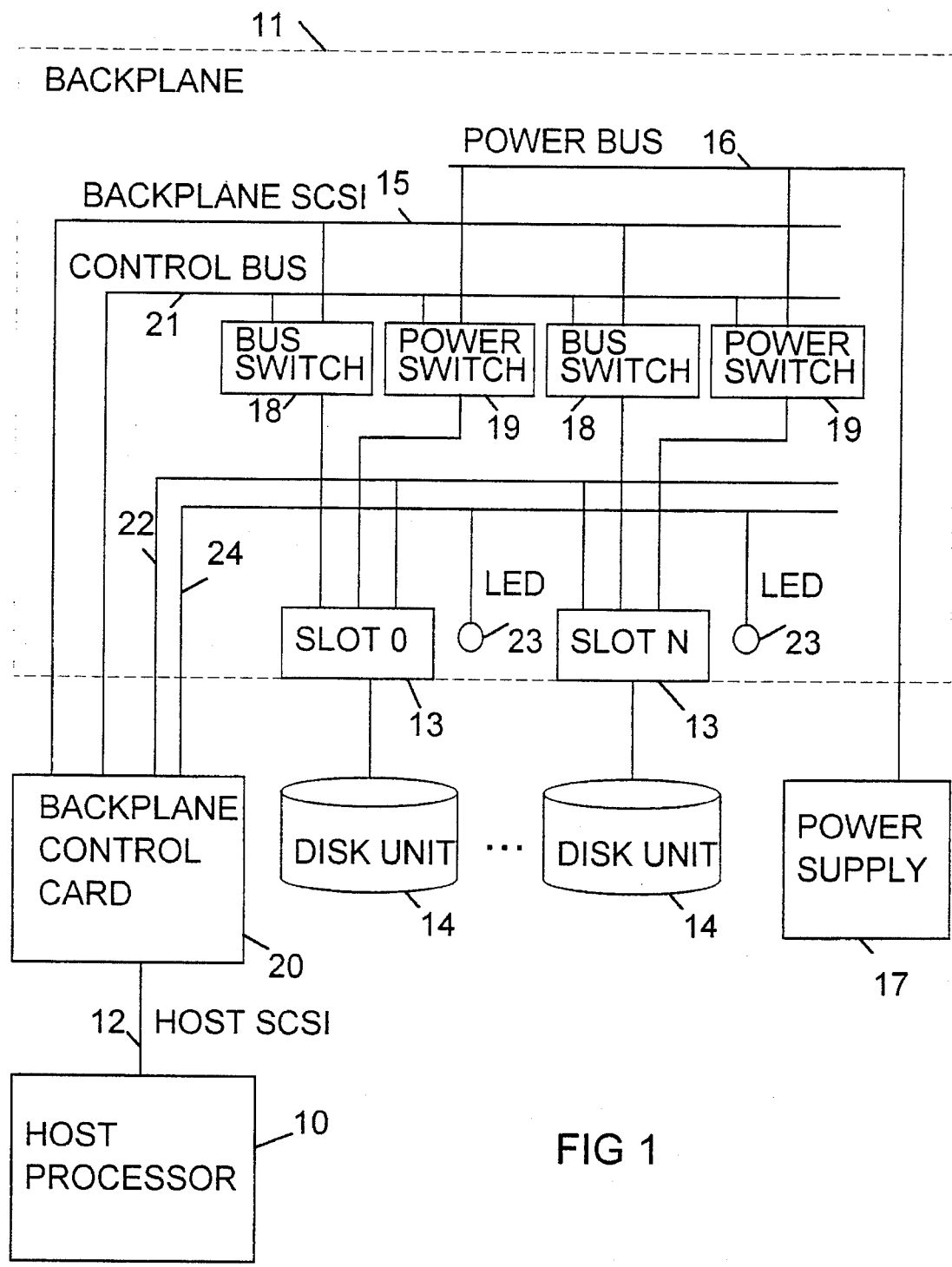
FIG. 1 is a block diagram of a computer system embodying the invention.

One embodiment of the invention will now be described by way of example with reference to the accompanying drawings.

SCSI Bus

Before describing the embodiment of the invention, the structure and operation of a SCSI bus will be briefly described. A SCSI bus comprises a set of data/address lines, and a set of control lines, including a busy (BSY) line, a select (SEL) line and an I/O line. Whenever one of the units on the bus requires to initiate a bus transfer, it waits until the bus is in the BUSFREE state, i.e. the BSY and SEL signals have both gone false for at least a bus settle delay. When the BUSFREE state is detected, the initiator unit enters an arbitration phase, in which it places its identifier on to the data lines, and asserts the BSY line. The initiator unit then checks whether any higher-priority unit has also placed its identifier on the bus; if so, the unit abandons its attempt to access the bus, until the next BUSFREE state. If there is no higher-priority unit arbitrating for the bus, the initiator unit then enters a selection phase, in which it asserts the SEL line, in addition to the BSY line, and places the identifier of the target unit on the data lines. The initiator unit then deasserts BSY. When BSY goes false, and I/O is false, for at least a bus settle delay, each unit on the bus compares the target identifier with its own identity, and if they are equal, asserts the BSY line. Following a message data transfer from the initiator to the target, data transfer can now take place between the initiator and the target. When the transfer is complete, and the target has returned a status and message to the initiator, the target de-asserts the BSY line, returning the bus to the BUSFREE state.

It should be noted that the arbitration and selection phases described above are only an example. The SCSI-2 specification permits other forms of selection and reselection cycles.

Overview of System

Referring to FIG. 1, the system comprises a host computer 10, and a number of backplanes 11 (only one shown). The host is connected to each of the backplanes by way of a host SCSI bus 12, which is a differential SCSI bus.

Each backplane 11 includes six mounting slots 13 (only two shown) each of which can have a disk drive unit 14 plugged into it. The backplane also includes a backplane SCSI bus 15, which is a single-ended SCSI bus, and a power bus 16, connected to a power supply unit 17.

Each slot has a set of bus isolation switches 18 associated with it, which, when enabled, connect the slot to the backplane SCSI bus. In this example, the switches are 74QST3384 bus switches, from Quality Semiconductor Inc. Each slot also has a set of power switches 19 which, when enabled, connect the slot to the power bus. Each slot also supplies a SCSI identity to the unit plugged into it.

When a slot is isolated from the backplane bus, by disabling the bus isolation switches, its local BSY line is held true. The effect of this is to prevent an isolated disk unit from arbitrating. Thus, when a slot is reconnected to the backplane bus, by enabling the bus isolation switches, the disk unit connected to that slot will be in a BUSFREE state. This ensures that all the disk units are kept in step.

The backplane also has a backplane control card 20 plugged into it. The control card is connected to the switches 18,19 by way of a control bus 21. As will be described, by applying suitable control signals to the control bus, the control card can connect or isolate any selected slot to or from the backplane SCSI bus, and can cause any selected slot to be powered up or down. A second backplane control card (not shown) may also be provided, for connecting the backplane to a second host processor, so as to enable high availability (HA) operation of the system.

Each of the slots on the backplane has a DISK IN line 22, which indicates whether or not a disk drive unit is currently inserted into the slot. The DISK IN lines are all fed to the backplane control card. Each slot also has an LED (light-emitting diode) 23 associated with it, for indicating whether it is safe to hot-swap the disk drive in that slot. These LEDs are controlled by signals from the control card over control lines 24.

Backplane Control Card

FIG. 2 shows the backplane control card 20 in more detail. The control card comprises differential SCSI receivers 25 and transmitters 26, connected to the host SCSI bus 12, and single-ended SCSI transmitters 27 and receivers 28, connected to the backplane SCSI bus 15. The differential receivers are connected to the single-ended transmitters by way of bus 29, and the single-ended receivers are connected to the differential transmitters by way of bus 30. Conversion between the differential and single-ended SCSI signals is controlled by a sequencer circuit 31, which tracks the arbitration/selection phases on the two SCSI busses and sets up the receivers and transmitters for the appropriate transfer direction.

In addition to controlling conversion between the two busses, the sequencer 31 also controls the bus isolation switches 18 on the backplane, via the control bus 21, as follows. At the point in the selection phase when the initiator deasserts the busy line BSY on the backplane SCSI bus, the SCSI data bits represent the identities of the two devices (source and target) that are participating in the transfer. The sequencer captures these data bits, and latches them. The sequencer then sends signals over the control bus, to disable all the bus isolation switches, except for those connecting the source and target devices to the SCSI bus. In other words, all the devices are isolated except for those participating in the transfer. The sequencer then waits until the next BUSFREE state, and then enables all the bus isolation switches, so as to reconnect all the devices to the SCSI bus.

Thus, it can be seen that during the data transfer phase of the bus, there is a simple one-to-one link between the initiator and target units; all other units are isolated from the bus. The effect of this is to reduce the bus capacitance and reflections during this phase, thereby cleaning up the bus signals and enabling faster, more error free operation.

The control card also includes a SCSI controller 32, connected to the busses 29,30 by way of isolation buffers 33,34. In this example the controller 32 is an NCR 53C90 SCSI chip. The control card also includes a microprocessor 35, which in this example is an 87C51GB chip. The microprocessor is connected to the busses 29,30 by way of driver and receiver circuits 36,37. The microprocessor is also connected to the DISK IN lines 22 and the LED control lines 24 of each backplane slot, and to the control bus 21, so as to allow it to send signals to the backplane switches 18,19 to control isolation and powering of the disk slots. Disconnections specified by the microprocessor override the connections enabled by the sequencer 31.

The microprocessor 35 and the controller 32 together act as a SCSI target, allowing the backplane to be accessed as a unit by the host processor, for diagnostic purposes, and to control hot-swapping of disk units, as will now be described.

Hot-Swapping of Disk Units

When it is required to hot-swap a particular disk drive, the host processor sends the microprocessor a message, over the host SCSI bus, identifying the disk drive slot in which the disk is located. This message is received by the SCSI controller, which passes the message to the microprocessor. The microprocessor then checks the state of the backplane bus. If it is not BUSFREE, the microprocessor waits until the bus is returned to the BUSFREE state.

When the bus is in the BUSFREE state, the microprocessor proceeds as follows. First, it sends a signal over the control bus to disable the bus switches for the selected disk drive slot, thereby isolating the disk drive from the backplane SCSI bus. Then, it sends signals over the control bus, to disable the power switches for the selected slot, thereby powering down the disk drive. The microprocessor then lights the indicator LED for the slot, to indicate that it is now safe to unplug the disk drive unit.

The microprocessor uses a polling routine to monitor the DISK IN lines from the backplane. Any state change in one clock cycle is confirmed in a subsequent cycle, so as to reject transient changes due to noise. Thus, the microprocessor can detect when the disk unit is removed from the slot, and similarly can detect when a disk unit is plugged back into the slot.

When the microprocessor detects that the disk has been swapped, it sends signals over the control bus to enable the power switch for that slot, thereby powering up the disk drive. After a delay sufficient to allow the disk drive to complete its power on reset sequence (but not necessarily to run up to speed), the microprocessor checks whether the backplane bus is in the BUSFREE state; if not, it waits. When the bus is in the BUSFREE state, the microprocessor sends signals over the control bus, to enable the bus isolation switch for that slot, thereby reconnecting the slot to the backplane bus.

In summary, it can be seen that when hot-swapping a disk unit, the unit is isolated from the backplane bus and then powered down, before it is indicated as being ready to swap. Then, when the unit has been swapped, it is powered up and then reconnected to the bus during the BUSFREE state. In this way, electrical disturbances on the bus during hot-swapping cannot corrupt data, even though the bus is fully active.

Diagnosis

The host processor can also instruct the microprocessor to isolate a specified disk slot on the backplane bus, for diagnosing faults. For example, if the backplane bus is not operating correctly because of failure of one of the disk units, the faulty disk unit can be identified by isolating each disk slot in turn, until the fault is removed.

Loop-Back Test

The host processor can also send a message to the microprocessor, over the host bus, instructing it to perform a loop-back test on the backplane bus transmitters/receivers. In this case, the microprocessor first sends signals over the control bus, to disable all the power switches, thereby powering down all the disk drive units on the backplane bus. When powered down, each disk drive unit presents a high impedance to the bus. The microprocessor then performs a loop-back test on the single-ended transmitters/receivers, by sending test signals from the transmitters, and observing the signals received by the receivers.

Address Tracking

Whenever the sequencer detects the selection phase on the backplane bus, it sends an interrupt signal to the microprocessor. When it receives this interrupt, the microprocessor reads the initiator and target identities from the data lines of the bus, in real time, and places them in a FIFO (first-in-first-out) store. Thus, the FIFO keeps a record of the last few connections made over the bus. The host processor can send a message to the microprocessor requesting it to supply the contents of the FIFO; this information is useful for diagnosis of faults.

Some Possible Modifications

It will be appreciated that many modifications may be made to the system described above without departing from the scope of the present invention. For example, the host SCSI bus may be a single-ended bus instead of a differential SCSI bus. In another possible modification, the host may provide information to the backplane control card (indicating which drive to swap etc.) by some means other than the host SCSI bus; for example by means of a separate control path.

We claim:

1. A computer system comprising:
   (a) a plurality of units;
   (b) a bus, interconnecting said units;
   (c) bus arbitration means connected to said bus for setting up a bus transfer between two of said units, and for then asserting a busy signal on said bus indicating that said bus is busy;
   (d) isolation means, connected between said units and said bus, for selectively isolating said units from said bus; and
   (e) control means connected to said bus and to said isolation means, for capturing identifiers from said bus identifying the two of said units that are participating in said bus transfer and for then instructing said isolation means to isolate from the bus all of said units other than the two of said units that are participating in said bus transfer, while said busy signal is asserted.

2. The computer system according to claim 1 further including means for holding a unit in a busy state while the unit is isolated from the bus, thereby preventing the unit from attempting to arbitrate for access to the bus.

3. The computer system according to claim 1 wherein said bus is a single-ended SCSI bus.

4. The computer system according to claim 1 wherein said control means further includes means for performing a loop-back test on said units.

5. A backplane for a computer system comprising:
   (a) a plurality of mounting slots;
   (b) a bus, interconnecting said slots, said bus including means for carrying identifiers identifying two of said slots that are participating in a bus transfer and means for carrying an indication of whether the bus is busy;
   (c) isolation means, connected between said slots and said bus, for selectively isolating said slots from said bus; and
   (d) control means connected to said bus and to said isolation means, for capturing identifiers from said bus identifying the two of said slots that are participating in said bus transfer and for then instructing said isolation means to isolate from the bus all of said slots other than the two of said slots that are participating in said bus transfer, while said bus is busy.

* * * * *